United States Patent
Janakiraman et al.

(10) Patent No.: US 10,833,883 B2
(45) Date of Patent: Nov. 10, 2020

(54) VIRTUAL CONFERENCING ASSISTANCE

(71) Applicant: International Business Machines Corporation, Armonk, NY (US)

(72) Inventors: Janani Janakiraman, Austin, TX (US); Fang Lu, Billerica, MA (US); Nadiya Kochura, Boston, MA (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/362,977

(22) Filed: Mar. 25, 2019

(65) Prior Publication Data
US 2020/0313916 A1    Oct. 1, 2020

(51) Int. Cl.
| | |
|---|---|
| G06F 3/00 | (2006.01) |
| H04L 12/18 | (2006.01) |
| G06F 9/451 | (2018.01) |
| G10L 15/26 | (2006.01) |
| G06F 11/34 | (2006.01) |
| G06N 20/00 | (2019.01) |

(52) U.S. Cl.
CPC .......... *H04L 12/1822* (2013.01); *G06F 9/453* (2018.02); *G06F 11/3438* (2013.01); *G06N 20/00* (2019.01); *G10L 15/265* (2013.01)

(58) Field of Classification Search
CPC ......... G06N 20/00; G06F 40/20; G06F 9/453; G06F 11/3438; H04L 12/1822; G10L 15/265
See application file for complete search history.

(56) References Cited

U.S. PATENT DOCUMENTS

2005/0268242 A1* 12/2005 White .................. H04L 12/1813
                                                                   715/751
2007/0300174 A1* 12/2007 Macbeth ................ G06Q 10/10
                                                                   715/772

(Continued)

FOREIGN PATENT DOCUMENTS

| WO | 2018112445 A1 | 6/2018 |
|---|---|---|
| WO | 2018170388 A1 | 9/2018 |

OTHER PUBLICATIONS

Aditi Kulkarni et al., Robotic Assistance in Indoor Navigation for People Who are Bliind, Mar. 1, 2016, IEEE Xplore, pp. 461-462 (Year: 2016).*

(Continued)

*Primary Examiner* — Tam T Tran
(74) *Attorney, Agent, or Firm* — Peter K. Suchecki

(57) ABSTRACT

Provided is a method, computer program product, and virtual conferencing system for providing virtual conferencing assistance to a user. A processor may monitor a virtual conferencing session between a plurality of users. The processor may detect a command to interact with a user interface (UI) element has been given. The processor may analyze UI action data in locating the UI element for the plurality of users. The processor may compare the UI action data for the plurality of users to a data threshold. The processor may determine, in response to the data threshold being met, that a user is experiencing difficulty in locating the UI element. The processor may provide, in response to determining that the user is experiencing difficulty, assistance to the user in locating the UI element.

17 Claims, 7 Drawing Sheets

(56) References Cited

U.S. PATENT DOCUMENTS

2014/0122056 A1 5/2014 Duan
2014/0298200 A1 10/2014 Cierniak
2017/0250930 A1 8/2017 Ben-Itzhak
2018/0176269 A1 6/2018 Griffin

OTHER PUBLICATIONS

Steven Dubowsky et al., PAMM—A Robotic Aid to the Elderly for Mobility Assistance and Monitoring: A "Helping-Hand" for the Elderly, Jan. 1, 2000, IEEE Xplore, pp. 570-576 (Year: 2000).*
Anonymous, "Method and System for Cognitive Augmentation of Voice Commands with Intention Inference in Smart Home Systems", IP.com No. IPCOM000249352D, Feb. 20, 2017, 4 pgs.
Mason, C., "Guide to how conversational UI and chat bots can help reinvent any app's UX," https://medium.com/punchkick-interactive/guide-to-how-conversational-ui-and-chat-bots-can-help-reinvent-any-apps-ux-60391140657e, Dec. 1, 2016k, printed Jan. 15, 2019, 22 pgs.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

VIRTUAL CONFERENCING ASSISTANCE

BACKGROUND

The present disclosure relates generally to the field of virtual conferencing, and more specifically, to providing virtual conferencing assistance to a user.

Virtual conferencing (e.g., web conferencing) has become a ubiquitous communication tool for conducting business in the modern world. Many businesses use web conferencing to hold virtual meetings where users can collaborate with each other via audio, visual, and textual mediums. However, some users may be unfamiliar with various aspects of a virtual conferencing user interface (UI) which may lead to inefficiencies in using available conferencing tools effectively.

SUMMARY

Embodiments of the present disclosure include a method, computer program product, and virtual conferencing system for providing virtual conferencing assistance to a user. A processor may monitor a virtual conferencing session between a plurality of users. The processor may detect a command to interact with a user interface element has been given. The processor may analyze user action data in locating the user interface element for the plurality of users. The processor may compare the user action data for the plurality of users to a data threshold. The processor may determine, in response to the data threshold being met, that a user is experiencing difficulty in locating the user interface element. The processor may provide, in response to determining that the user is experiencing difficulty, assistance to the user in locating the user interface element.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
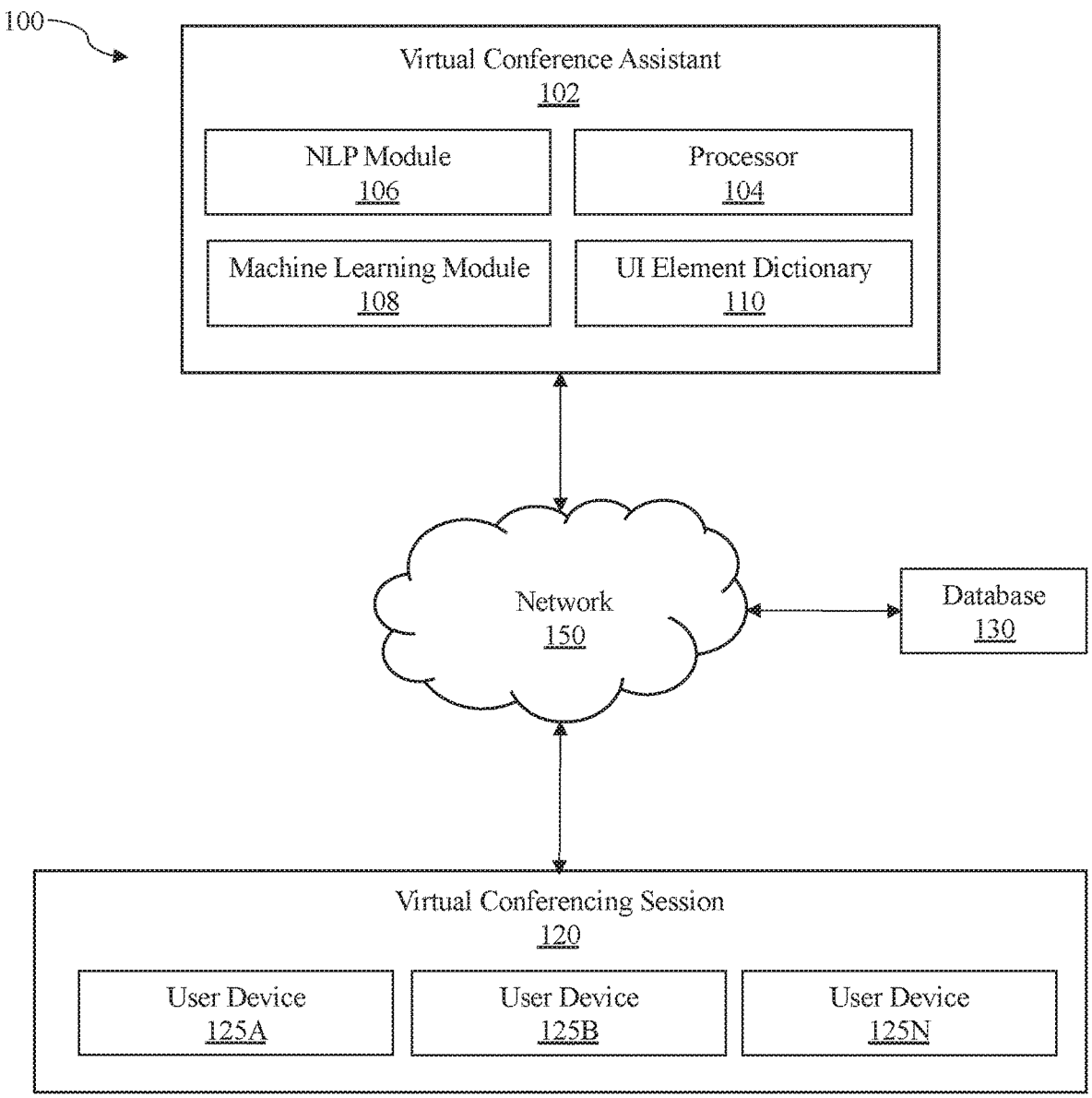
FIG. 1 illustrates a block diagram of a virtual conferencing system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of virtual conferencing, and more particularly to providing virtual conferencing assistance for a user. While the present disclosure is not necessarily limited to such applications, various aspects of the disclosure may be appreciated through a discussion of various examples using this context.

Virtual conferencing (e.g., web conferencing) has become a ubiquitous communication tool for conducting business in the modern world. Many businesses use web conferencing to hold virtual meetings where users can collaborate with each other via audio, visual, and textual mediums. However, some users may be unfamiliar with various aspects of a virtual conferencing user interface (UI) which may lead to inefficiencies in using available web conferencing tools effectively.

For example, a presenter on a web conference may request all users to go on mute because of background noise coming from one or more of the other users (e.g., participants). A user who is unfamiliar with the web conferencing software may have difficulty finding the mute button on the UI to mute their line. As a result, the user may still be heard during the web conference which may distract the presenter and the other users. The user may try to search for help within an online help tool, but this may take significant time for a user that is unfamiliar with the UI software.

Embodiments of the present disclosure provide virtual conferencing assistance to one or more users that may be experiencing difficulty with operating a virtual conferencing UI during a conferencing session. The system may monitor the conferencing session to determine contextual cues from one or more users. For example, the system may determine by analyzing spoken content via natural language processing that a single presenter has given a command to the other users. The system may determine that the command given has instructed the users to utilize a UI element (e.g., mute icon, screen share icon, chat box, etc.).

For example, the presenter may direct the other users to start sharing their computer screen. The system will analyze the spoken content from the virtual conferencing session data stream and detect the command to "share their screen." Once the command has been detected the system will monitor UI action data (e.g., mouse clicks, response time to fine UI element, etc.) of the users to determine if one or more user are experiencing any difficulty or confusion when trying to share their screen. The system may determine that one or more users are experiencing difficulty by comparing their respective UI action data to a UI action data threshold.

For example, the system may determine that a user is confused by detecting UI action data indicative of multiple mouse clicks and/or screen window changes within a predetermined time period for locating the share screen icon. Meeting the UI action data threshold may indicate that the user is having difficulty finding the share screen icon. Once the system determines one or more users have failed to locate a respective UI element within the required threshold, the system will become an active participant on the respective user's UI and provide assistance to the one or more users experiencing difficulty. For example, a virtual assistant (e.g., chat bot, web bot, etc.) may provide various guidance (e.g., texts, images, audio, and/or video) to the user for locating and activating the share screen icon.

In embodiments, the system may learn from other users how to locate various UI elements and create guidance for confused users. In embodiments, the system may analyze web meeting logs, UI documentation, UI screenshots of areas in response to actions taken by users as a result of commands regarding UI elements, and the behavioral patterns of the users using crowd sourcing. For example, experienced users may only take one or two mouse clicks to find a respective UI element when prompted. The system may learn and/or track (e.g., record video/audio, take screenshots of the UI, etc.) the actions of the experienced users when locating a respective UI element and create guidance (e.g., screenshots, audio, video, etc.) based off of the user actions. Once created, the guidance may be provided to a user determined to be experiencing difficulty.

For example, during a learning phase the system may analyze UI action data for a plurality of users when locating a screen share icon once a command is given (e.g., "Please share your screen."). Once the command to locate a UI element is given, the system may record screen shots of the user actions taken by the users for successfully locating the screen share icon. The system may analyze the screen shots and create user guidance highlighting various differences for locating the screen share icon in the images.

In embodiments, the system may analyze different commands and spoken content of experienced users when trying to help a confused user. For example, the system may analyze commands given by an expert user to help a confused user during a communication session. For example, the expert user may verbally indicate to the inexperienced user where to locate the mute button icon. The system may analyze these commands and correlate the commands with UI actions to update user guidance for providing assistance to inexperienced users.

In embodiments, the system may adjust various parameters, such as UI action data thresholds for determining a user is experiencing difficulty, based on user profiles. For example, a user may include various disabilities and/or preferences within their user profile. The system may analyze the user profile and dynamically adjust various metrics for determining the appropriate assistance to provide when a user is determined to be experiencing difficulty.

For example, the system may increase a response time threshold for finding a UI element for a user that may be disabled and have slower reflexes. In this way, a user that may have a disability may be given longer time for finding the UI element before the system determines the user is experiencing difficulty. In embodiments, the system may provide assistance based on different preferences within a user profile. For example, audio cues may be provided to a blind user, while only visual/textual cues may be provided to a deaf user.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a virtual conferencing system 100, in accordance with embodiments of the present disclosure. In the illustrated embodiment, the virtual conferencing system 100 includes a virtual conferencing assistant 102 and a database 130 that are communicatively coupled to a virtual conferencing session 120 via a network 150. In the illustrated embodiment, the virtual conferencing session 120 includes user device 125A, user device 125B, and user device 125N (collectively referred to as user devices 125). In other embodiments, additional or fewer user devices 125 may be included in the virtual conferencing session 120. It is contemplated that the user devices 125 are operated by one or more users within the virtual conferencing session 120. The user devices 125 may be any type of device (e.g., computer, smartphone, tablet, etc.) configured to communicatively connect to the virtual conferencing session 120. The user devices 125 may be any type of computer system and may be substantially similar to computer system 1101 of FIG. 5. In embodiments, the user devices 125 may communicate with the virtual conferencing assistant 102 via the network 150. The user devices 125 may also communicate with one another via the network 150. The network 150 may be any type of communication network, such as a wireless network or a cloud computing network.

Figure 6:
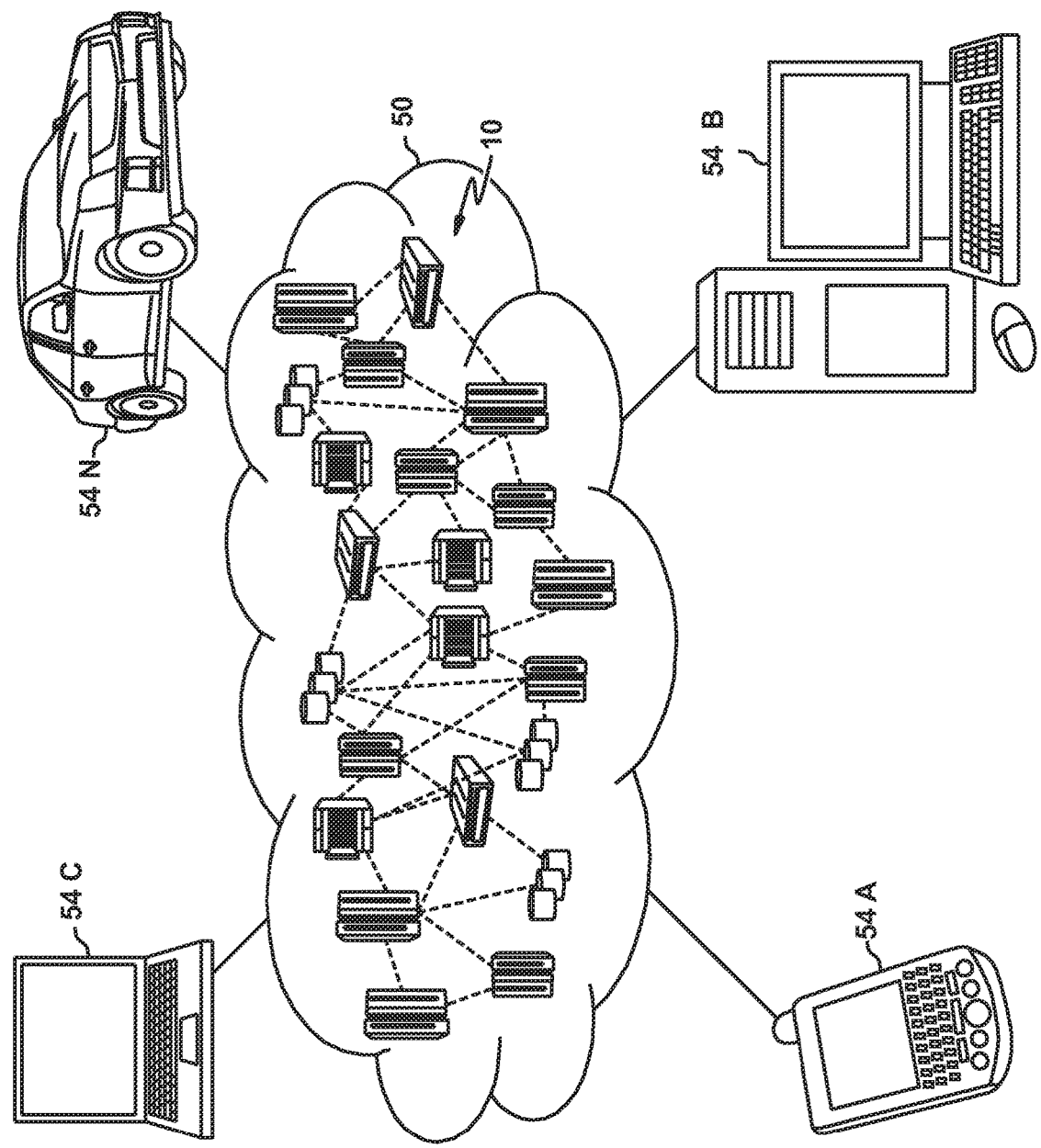
FIG. 6 depicts a cloud computing environment according to an embodiment of the present invention.
Figure 7:
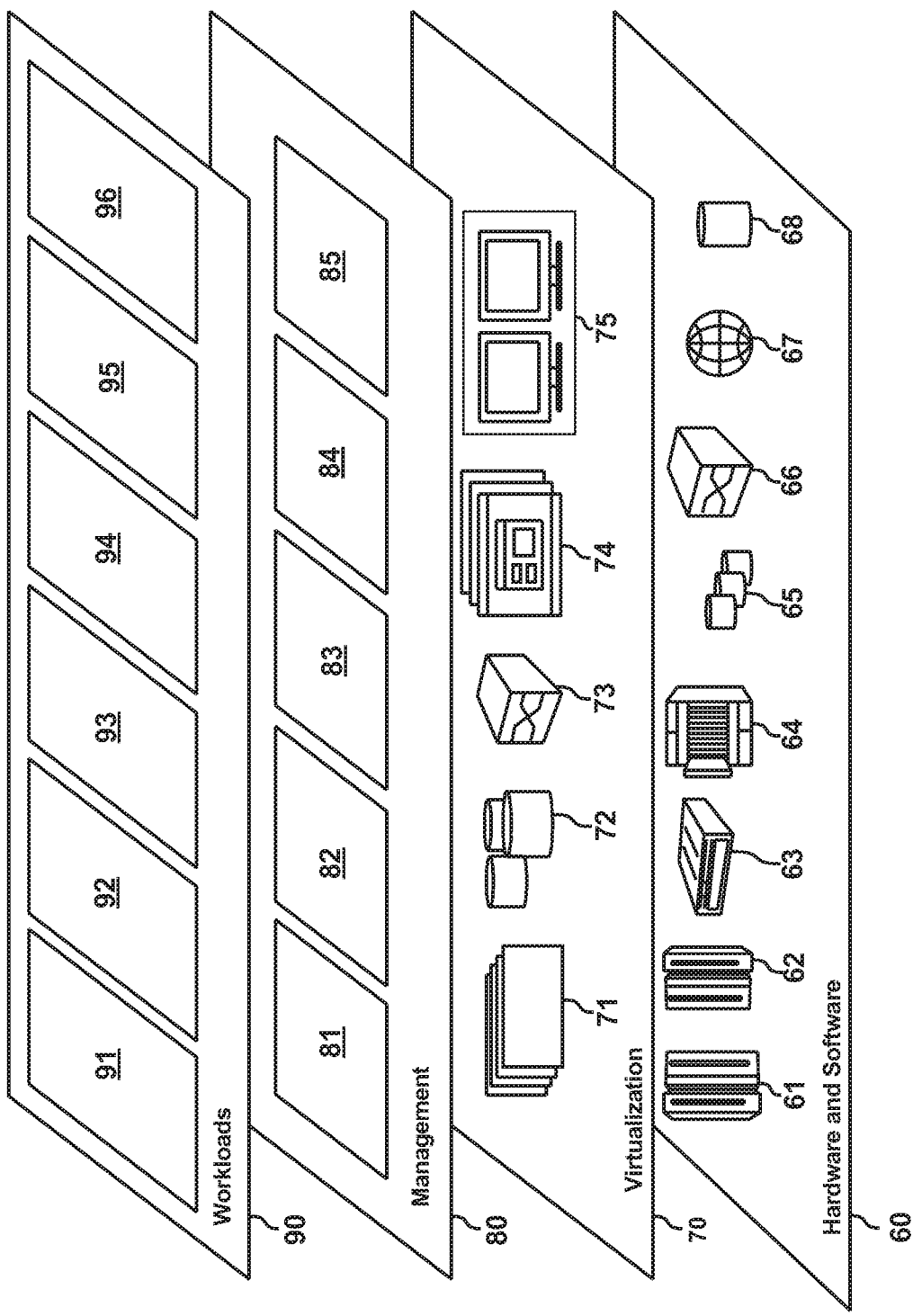
FIG. 7 depicts abstraction model layers according to an embodiment of the present invention.

The network 150 may be substantially similar to, or the same as, network 50 described in FIG. 6 and FIG. 7. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the virtual conference assistant 102 may communicate with user device 125A using a WAN, one or more hardwire connections (e.g., an Ethernet cable) and/or wireless communication networks (e.g., wireless router). In some embodiments, the various systems may be communicatively coupled using a combination of one or more networks and/or one or more local connections. For example, the virtual conference assistant 102 may communicate with user device 125A using a wireless network, while user device 125B may be hardwired (e.g., connected with an Ethernet cable) to the virtual conference assistant 102.

The virtual conference assistant 102 and the user devices 125 may be distant from each other and communicate over network 150. In some embodiments, the virtual conference assistant 102 may be a central hub from which each user device 125 can establish a communication connection, such as in a client-server networking model. Alternatively, the virtual conference assistant 102 and user devices 125 may be configured in any other suitable networking relationship (e.g., using any other network topology). The virtual conference assistant 102 may be any type of computer system and may be substantially similar to computer system 1101 of FIG. 5. In embodiments, the virtual conference assistant 102 may be a standalone device or located on another device, such as database 130.

In the illustrated embodiment, the virtual conference assistant 102 includes a processor 104, a natural language processing (NLP) module 106, a machine learning module 108, and a UI element dictionary 110. The NLP module 106 is configured to analyze spoken content received from a data stream of the virtual conferencing session 120. The NLP module 106 may analyze the spoken content to detect various commands to interact with UI elements on the user interfaces of the user devices 125. For example, the NLP module 106 may detect the words "mute your line" when spoken during the virtual conferencing session 120. The NLP module 106 may correlate the word "mute" with a UI action to use the mute button retrieved from a UI element dictionary 110.

The machine learning module 108 is configured to learn from various inputs and user actions through supervised and unsupervised learning. In embodiments, the system may be initially trained through supervised learning to recognize various commands for interacting with UI elements. For example, the system may be trained to classify UI actions (e.g., mute, chat, screen share, etc.) with phrases detected from spoken content of users (e.g., please go on mute, please share your screen).

In embodiments, the system may build the UI element dictionary 110 that maps UI actions to UI elements. For example, the UI action "share screen" is mapped to the share screen icon (e.g., UI element). The UI element dictionary may include various user guidance to provide users assistance on interacting with a respective UI element. In embodiments, the guidance may include various text, descriptions, images, video, and/or audio media depending on the type of challenges a user may be experiencing. For example, mute icon guidance may include various videos on how to find the mute icon. The system may retrieve this video when the UI action mute is detected from a phrase uttered by a user (e.g., please mute your line) and another user is determined to be experiencing difficulty in finding the UI element. The UI element dictionary 110 is further discussed in FIG. 4.

The machine learning module 108 may include one or more artificial neural networks configured to learn from user actions monitored by the virtual conference assistant 102. For example, the machine learning module 108 may learn the behavioral patterns of the application users (e.g., crowdsourcing) and apply the learned patterns for building relevant user guidance for providing assistance to other users in real time. For example, the system may analyze user actions in response to a moderator saying, "Please use the chat box." The system may capture screenshots or video snippets relevant to the locating the chat box. The system may take these captured screenshots and/or video snippets and generate a guidance to be presented to a confused user in real time.

For example, based on the learned user actions, the system may present the confused user with before and after images of how to locate the chat box icon on the user interface. In this way, the system helps the confused user effectively perform the UI action requested by the moderator. As more user actions are learned by the system 100, the weights of the neural network can be adjusted, automatically, by processor 104. Over time, the system 100 can become more accurate in determining what type of assistance to provide a confused user is needed.

In embodiments, the virtual conference assistant 102 may send, receive, and/or store data at database 130. For example, the virtual conference assistant 102 may store historical user actions data and user profile data where it can be accessed and analyzed by the virtual conference assistant 102. In embodiments, the user action data and user profile data may be stored on the virtual conference assistant 102, the database 130, and/or the user devices 125. The database 130 may be any type of computer system and may be substantially similar to computer system 1101 of FIG. 5. In some embodiments, database 130 may be a cloud database.

It is noted that FIG. 1 is intended to depict the representative major components of the virtual conferencing system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the virtual conferencing system 100 may not be present, and the arrangement of components may vary.

For example, while FIG. 1 illustrates an example virtual conferencing system 100 having a single virtual conference assistant 102 and one virtual conferencing session 120 between a plurality of user devices 125, suitable network architectures for implementing embodiments of this disclosure may include any number of virtual conference assistants, virtual conferencing sessions, and user devices. The various models, modules, systems, and components illustrated in FIG. 1 may exist, if at all, across a plurality of virtual conference assistants, virtual conferencing sessions, and user devices.

Figure 2:
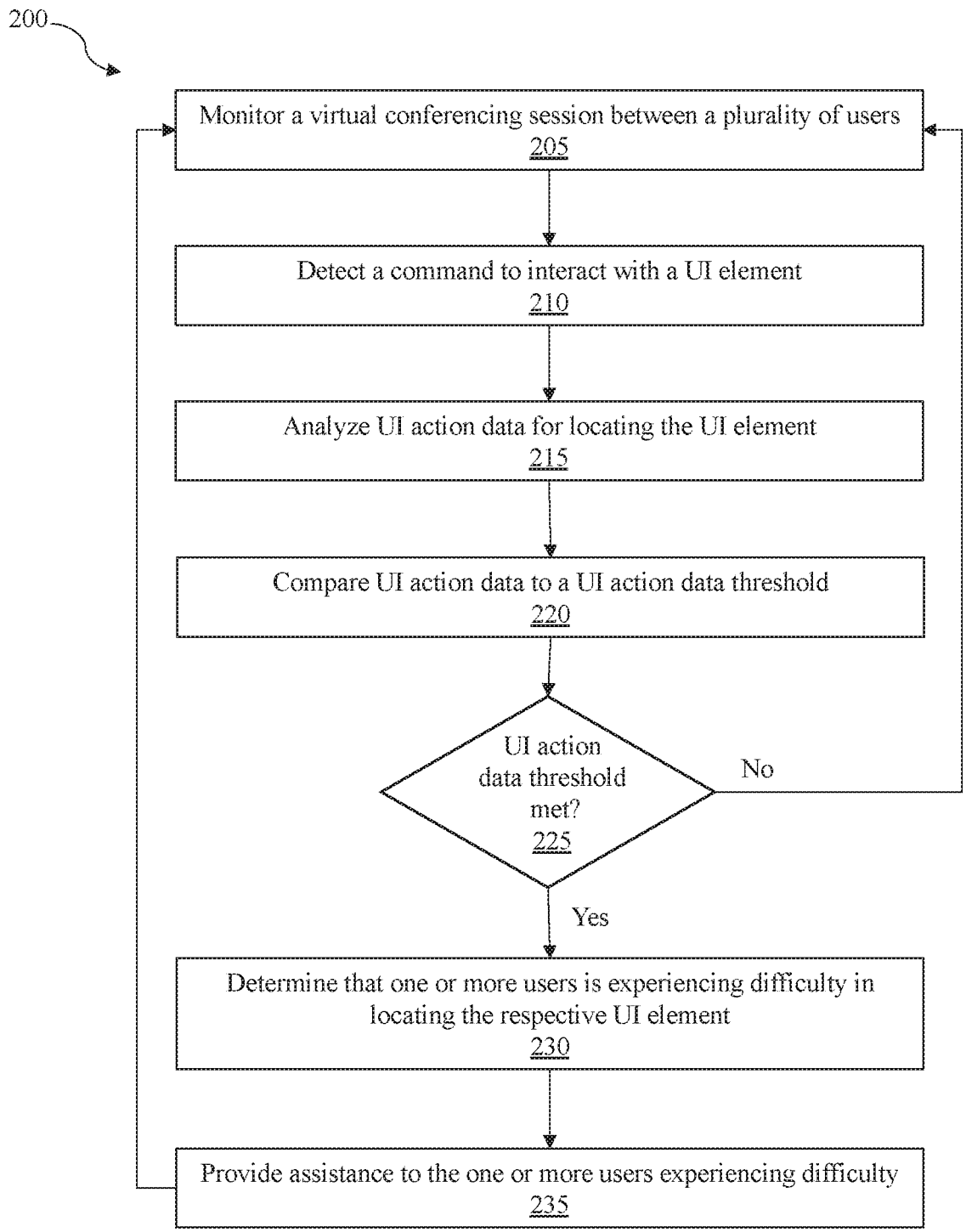
FIG. 2 illustrates a flow diagram of an example process for providing virtual conferencing assistance to one or more users, in accordance with embodiments of the present disclosure.

Referring now to FIG. 2, shown is a flow diagram of an example process 200 for providing virtual conferencing assistance to one or more users, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. In some embodiments, the process 200 may be performed by processor 104 exemplified in FIG. 1.

The process 200 begins by monitoring a virtual conferencing session between a plurality of users. This is illustrated at step 205. In embodiments, the system may passively monitor a data stream generated from the virtual conferencing session. For example, audio data may be monitored to detect spoken commands from one or more of the users participating in the virtual conference session. In embodiments, the system may apply natural language processing to generate speech to text data from the spoken content. The system may analyze this textual data to determine specific keywords that are associated with one or more commands to interact with one or more UI elements.

The process 200 continues by detecting a command to interact with a UI element has been given by one or more of the plurality of users within the virtual conferencing session. This is illustrated at step 210. For example, a user in the virtual conferencing session may say the phrase "please go on mute" to the other participants in the conference. The system will detect the keyword "mute" through natural language processing and determine that the word corresponds to muting audio using a mute button icon (e.g., UI element). The system may determine the keyword mute corresponds to muting audio via the UI element dictionary exemplified in FIG. 4. In embodiments, the system may detect indirect commands by further utilizing the UI element dictionary. For example, the various phrases such as "What can we do about the background noise" and "where is the background noise coming from" may be linked to UI actions and UI elements within the UI element dictionary allowing the system to provide guidance when detecting indirect commands.

The process 200 continues by analyzing UI action data for the plurality of users for locating the UI element. This is illustrated at step 215. In embodiments, UI action data may be generated from each user when performing certain actions, such as clicking the mouse, switching through different viewing windows, selecting a UI element, and the like. For example, the system may monitor the number of mouse-clicks each user generates to get to a respective UI element. For example, when prompted by another user to share their computer screen, an expert user may find the share screen icon in two mouse clicks. Alternatively, a beginner level user may take ten mouse clicks to find the share screen icon.

In another embodiment, the UI action data may be based on time data, such that the system may determine the length of time it takes a user to find a respective UI element once a command is given. For example, a presenter in a conference may request that the users participating in the virtual conferencing session open a chat box to ask any questions. The system may analyze the response time it takes each user to open the chat box from when the command to open the chat box was given.

The process 200 continues by comparing the UI action data for the plurality of users to a UI action data threshold. This is illustrated at step 220. For example, once a command to perform an action related to a UI element is detected, the system will analyze UI action data (e.g., mouse clicks, response time in finding UI element, etc.) and compare it to a threshold. For example, if a presenter during the virtual conference tells all users to mute their lines, the system may analyze the number of mouse clicks it takes each user to find the mute button and compare that number to a maximum number of mouse clicks (e.g., 7 mouse clicks).

If the UI action data threshold has not been met, "No" at step 225, the process 200 will return to monitoring the virtual conferencing session at step 205. For example, if an average level user typically takes less than 5 mouse clicks to access the mute button, the UI action data threshold may be set to 7 mouse clicks. In this way, the UI action data threshold would not be met for average level users and the system will continue to monitor the virtual conferencing session for other commands.

If the data threshold has been met, "Yes" at step 225, the process 200 will continue by determining that the one or more users are experiencing difficulty in locating the UI element. This is illustrated at step 230. For example, if a beginner level user has exceeded the data threshold of 7 mouse clicks, the system will determine that the user is experiencing difficulty.

The data threshold may be determined in various ways. In embodiments, the data threshold may be determined by an average response time taken for the plurality of users to locate a respective UI element. For example, the data threshold may be a rolling threshold that changes as more or fewer users locate the UI element based on time. In this way, if many of the users have found the respective UI element quickly, the threshold may decrease in order for the system to quickly determine that one or more users are experiencing difficulty. In another embodiment, the data threshold may be determined by an average number of mouse clicks taken by the plurality of users to locate the respective UI element. In some embodiments, the data threshold may be a predetermined data threshold based on historical user response time and/or historical user number of mouse clicks. In other embodiments, the UI action data threshold may be based on other UI action data (e.g., opening/closing windows, searching tool bars, etc.).

In some embodiments, the UI action data threshold may be different for each user. The threshold may be set based on user data for the users, which may be stored in a database or user profile. For example, a user with certain disabilities may be given a longer amount of time to locate a UI element. As another example, if a user consistently requires a certain amount of time (or certain number of clicks) to perform an action, the threshold may be set based on that user's historical data (e.g., the amount of time that user takes).

The process 200 continues by providing assistance to the one or more users in locating the UI element. This is illustrated at step 235. The system may provide various data (e.g., text, images, video, audio) and/or guidance to aid the user experiencing difficulty in finding the appropriate UI element. In embodiments, the system may provide captured screenshots, audio, or video snippets relevant to the UI action. For example, a user may be provided with a screen shot of where the mute button is located on the user interface. In another embodiment, the system may analyze and record user actions (e.g. video, text, images, audio, screenshots, etc.) from the user interfaces of other experienced users (e.g., crowdsourcing) to learn how to locate the respective UI element and create user guidance to be provided the confused user. In yet another embodiment, the UI element displayed on the user's screen may change to help guide the user to the UI element. Example changes to the UI element include, but are not limited to, the UI element getting larger, changing color, blinking, and/or including an arrow or other indicator that moves from the location of the user's cursor to the UI element. Generating user guidance is further detailed in FIG. 3.

In embodiments, the system may initiate a virtual conversation relevant to the respective UI element with a user experiencing difficulty. The virtual conversation may include a description on how to locate and use the UI element and may further guide the user through a multi-step scenario for accessing the UI element. Once the assistance has been provided to the one or more users experiencing difficulty, the process 200 may return to step 205.

Figure 3:
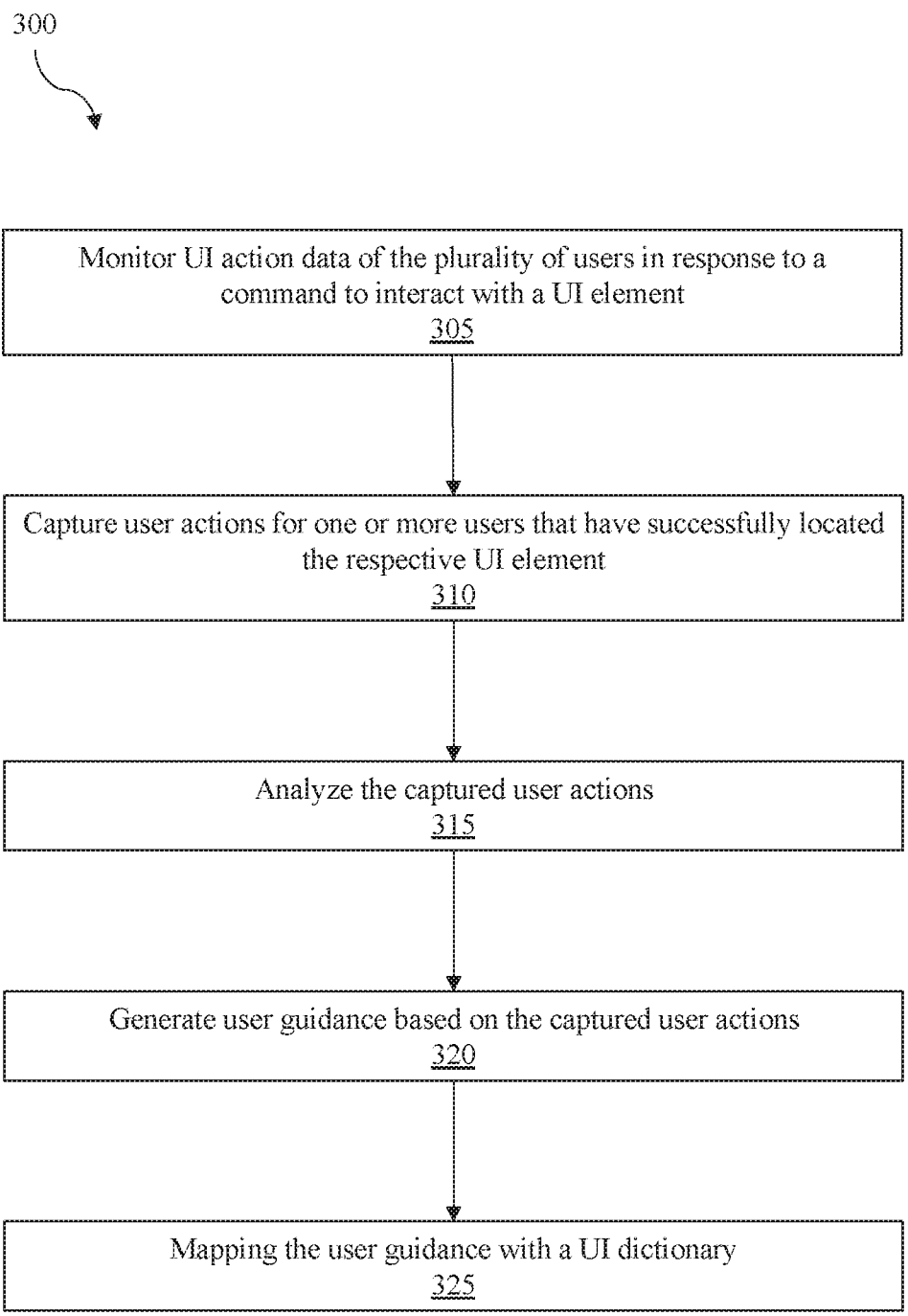
FIG. 3 illustrates a flow diagram of an example process for generating user guidance for locating user interface elements, in accordance with embodiments of the present disclosure.

Referring now to FIG. 3, shown is a flow diagram of an example process 300 for generating user guidance for locating user interface elements, in accordance with embodiments of the present disclosure. The process 300 may be in addition to, or a subset of, process 200. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. In some embodiments, the process 300 may be performed by processor 104 exemplified in FIG. 1.

The process 300 begins by monitoring UI action data of a plurality of users in response to a command to interact with a UI element. This is illustrated at step 305. For example, when a command, such as "please use the chat panel" is given in a virtual conferencing session, the system will recognize the phase containing the keyword "chat panel" and the processor will begin monitoring UI action data (e.g., mouse clicks, icon selection, etc.) of the users for finding the proper UI element (e.g., the chat box or chat panel).

The process 300 continues by capturing user actions for one or more users that have successfully located the UI element. This is illustrated at step 310. For example, the system will capture various types of user actions (e.g., screen shots of the respective user's screen searching for the UI element, video of the user's screen locating the UI element, etc.) for users that have successfully located the UI element.

The process 300 continues by analyzing the captured user actions. This is illustrated at step 315. The system may analyze the captured user actions and highlight various aspects of the user actions for locating the UI element. For example, the processor may analyze before and after screenshots of a UI where the mute button icon is highlighted. Once the captured user actions are analyzed, the process 300 continues by generating user guidance for locating the UI element from the captured user actions. This is illustrated at step 320.

Once the user guidance is generated, the process 300 continues mapping the user guidance in locating the UI element to a respective UI element in a UI element dictionary. This is illustrated at step 325. For example, the user guidance generated from screenshots from a user locating the mute button icon will be mapped to the mute button icon in the UI element dictionary. In this way, when the system detects a command to interact with a respective UI element has been given, the system will retrieve the appropriate guidance and present it to a user experiencing difficulty. In embodiments, the system may continuously learn by analyzing the user actions of the users when interacting with their respective user interfaces and update the user guidance.

Figure 4:
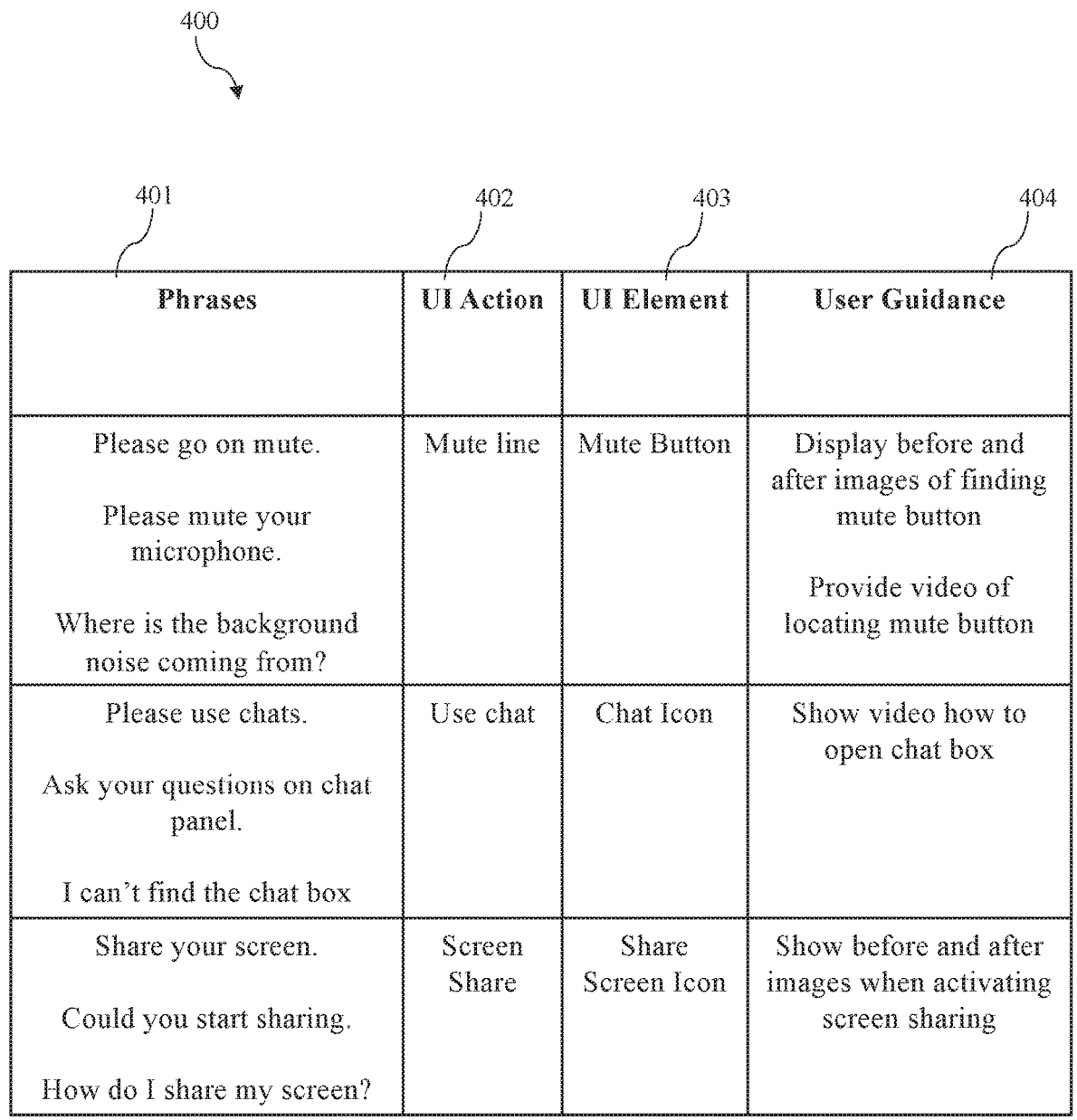
FIG. 4 illustrates an example user interface element dictionary, in accordance with embodiments of the present disclosure.

Referring now to FIG. 4, shown is an example UI element dictionary 400, in accordance with embodiments of the present disclosure. In some embodiments, the UI element dictionary of FIG. 4 is consistent with UI element dictionary 110 of FIG. 1. In the illustrative embodiment, the UI element dictionary 400 includes various phrases 401 that are mapped to respective UI actions 402 and UI elements 403. For example, the phrases 401 "Please go on mute" and "Please mute your microphone" are both mapped to the UI action 402 "Mute line." In this way, the virtual conference assistant may detect multiple phrases 401 that apply to the same UI action 402. Similarly, phrases such as "please unmute your microphone" and the like may be mapped to the mute button if the mute button acts as a toggle switch (e.g., is used to both mute and unmute the device).

Further each UI action 402 is mapped to a respective UI element 403. For example, the UI action 402 "Mute line" is mapped to the mute button UI element 403. Mapping the UI action 402 to the UI element 403 allows the system to determine which UI element 403 has been referred to during a virtual conferencing session. This allows the virtual conference assistant to determine the appropriate assistance to provide a confused user for finding a respective UI element 403.

Each UI element 403 includes mapped user guidance 404 for providing assistance to a confused user. In some embodiments, the user guidance 404 may include multiple types of guidance depending on the user experiencing difficulty. For example, the user guidance 404 associated with the UI element 403 "Mute Button" includes displaying before and after images of the mute button and/or providing video for locating the mute button. The user guidance 404 may be updated with learned guidance based on analyzing user actions taken by other users via crowdsourcing.

The UI element dictionary 400 is only shown as an example and is not meant to be limiting. Various other phrases, UI actions, UI elements, and user guidance may be included in other embodiments of the UI element dictionary.

Figure 5:
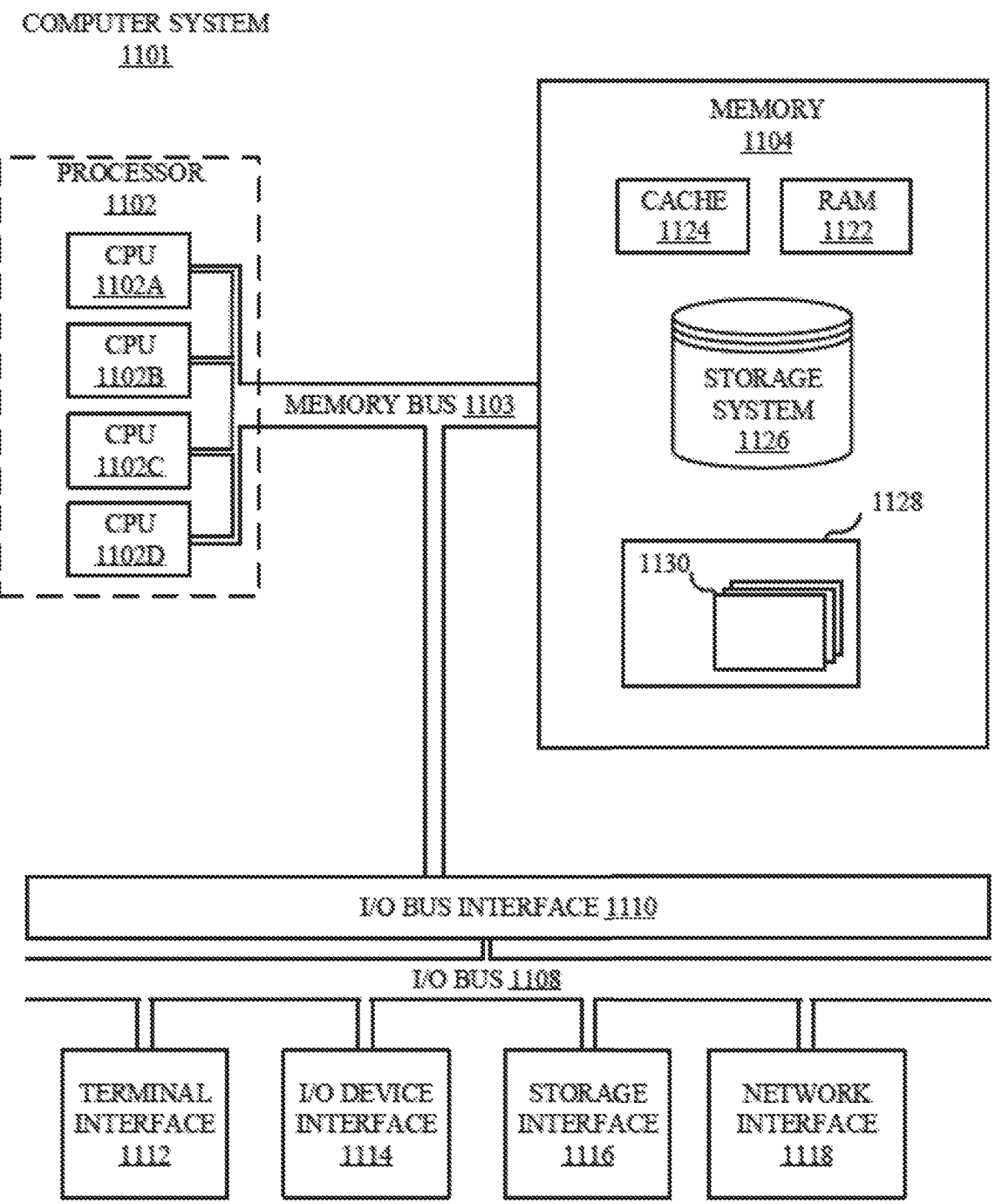
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory 1104 may include computer system readable media in the form of volatile memory, such as random access memory (RAM) 1122 or cache memory 1124.

Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
monitoring, by a processor, a virtual conferencing session between a plurality of users;
detecting, by the processor, a command to interact with a user interface (UI) element has been given;
analyzing, by the processor, UI action data for locating the UI element on a user interface for each of the plurality of users;
comparing, by the processor, the UI action data for the plurality of users to a UI action data threshold;
determining, by the processor and in response to the UI action data threshold being met for a user, that the user is experiencing difficulty in locating the UI element; and
providing, by the processor and in response to determining that the user is experiencing difficulty, assistance to the user in locating the UI element, wherein providing assistance to the user experiencing difficulty in locating the UI element is based on a user profile associated with the user.

2. The method of claim 1, further comprising:
monitoring, by the processor, UI action data of the plurality of users in response to the command to interact with the UI element;
capturing, by the processor, user actions for one or more users that have successfully located the UI element;
analyzing, by the processor, the captured user actions by utilizing machine learning;
generating, by the processor, user guidance for locating the UI element from the captured user actions; and
mapping, by the processor, the user guidance to one or more UI elements in a UI element dictionary.

3. The method of claim 2, further comprising:
updating, by the processor, the user guidance for locating UI elements based on behavioral patterns of one or more users.

4. The method of claim 1, further comprising:
generating, by the processor and using natural language processing, textual data from spoken content received from the virtual conferencing session; and
analyzing, by the processor and using natural language processing, the textual data for keywords that indicate commands to interact with one or more UI elements.

5. The method of claim 1, further comprising:
classifying, by the processor, the command with a UI action that corresponds to the UI element.

6. The method of claim 5, further comprising:
generating, by the processor, a UI element dictionary, wherein UI actions are mapped to UI elements.

7. The method of claim 1, further comprising:
retrieving, by the processor, user guidance for providing assistance in locating the UI element from a UI element dictionary.

8. The method of claim 1, wherein the UI action data threshold is based on an average response time for locating the UI element by the plurality of users.

9. The method of claim 1, wherein the UI action data threshold is based on an average number of mouse clicks for locating the UI element by the plurality of users.

10. The method of claim 1, wherein the user profile includes preferences for receiving user guidance in a preferred format.

11. The method of claim 1, wherein the data threshold is adjusted based on the user profile for each of the plurality of users.

12. A virtual conferencing system comprising:
a virtual conference assistant communicatively coupled to one or more devices in a virtual conferencing session, wherein the virtual conference assistant comprises:
a processor, wherein the processor is configured to perform a method, the method comprising:
monitoring the virtual conferencing session between a plurality of users;

generating, using natural language processing, textual data from spoken content received from the virtual conferencing session;

analyzing, using natural language processing, the textual data for keywords that indicate commands to interact with one or more user interface (UI) elements;

detecting a command to interact with a UI element has been given;

analyzing UI action data for locating the UI element on a user interface for each of the plurality of users;

comparing the UI action data for the plurality of users to a UI action data threshold;

determining, in response to the UI action data threshold being met for a user, that the user is experiencing difficulty in locating the UI element; and providing, in response to determining that the user is experiencing difficulty, assistance to the user in locating the UI element.

13. The virtual conferencing system of claim 12, wherein the method performed by the processor further comprises:

monitoring UI action data of the plurality of users in response to the command to interact with the UI element;

capturing user actions for one or more users that have successfully located the UI element;

analyzing the captured user actions by utilizing machine learning;

generating user guidance for locating the UI element from the captured user actions; and mapping the user guidance to one or more UI elements in a UI element dictionary.

14. The virtual conferencing system of claim 12, wherein the method performed by the processor further comprises:

retrieving user guidance for providing assistance in locating the UI element from a UI element dictionary.

15. A computer program product comprising a computer-readable storage medium having program instructions embodied therewith, wherein the computer-readable storage medium is not a transitory signal per se, the program instructions executable by a processor to cause the processor to perform a method comprising:

monitoring a virtual conferencing session between a plurality of users;

detecting a command to interact with a user interface (UI) element has been given;

analyzing UI action data for locating the UI element on a user interface for each of the plurality of users;

comparing the UI action data for the plurality of users to a UI action data threshold;

determining, in response to the UI action data threshold being met for a user, that the user is experiencing difficulty in locating the UI element;

retrieving user guidance for providing assistance in locating the UI element from a UI element dictionary; and providing, in response to determining that the user is experiencing difficulty, the user guidance to the user in locating the UI element.

16. The computer program product of claim 15, wherein the method performed by the processor further comprises:

monitoring UI action data of the plurality of users in response to the command to interact with the UI element;

capturing user actions for one or more users that have successfully located the UI element;

analyzing the captured user actions by utilizing machine learning;

generating the user guidance for locating the UI element from the captured user actions; and mapping the user guidance to one or more UI elements in the UI element dictionary.

17. The computer program product of claim 15, wherein the method performed by the processor further comprises:

generating, using natural language processing, textual data from spoken content received from the virtual conferencing session; and analyzing, using natural language processing, the textual data for keywords that indicate commands to interact with one or more UI elements.

* * * * *